United States Patent [19]

Endres et al.

[11] Patent Number: 5,508,058
[45] Date of Patent: Apr. 16, 1996

[54] PROTEINACEOUS FEED SUBSTANCES HAVING LOW LEVELS OF ZINC AND HIGH RUMEN-BYPASS POTENTIALS, AND A METHOD FOR THE PRODUCTION THEREOF

[75] Inventors: Joseph G. Endres; Janet C. Smith; Charles W. Monagle, all of Fort Wayne, Ind.

[73] Assignee: Consolidated Nutrition, L.C., Omaha, Nebr.

[21] Appl. No.: 933,338

[22] Filed: Aug. 21, 1992

[51] Int. Cl.$^6$ ........................................ A23K 1/00
[52] U.S. Cl. .................................... 426/635; 426/640
[58] Field of Search .................... 426/635, 630, 426/648, 623, 640

[56] References Cited

U.S. PATENT DOCUMENTS

| | | | |
|---|---|---|---|
| 2,295,643 | 9/1942 | Emery et al. | 99/2 |
| 2,585,793 | 2/1952 | Kruse | 99/98 |
| 2,710,258 | 6/1955 | Kruse | 99/98 |
| 3,268,335 | 8/1966 | Circle et al. | 99/15 |
| 3,463,858 | 8/1969 | Anderson | 424/289 |
| 3,619,200 | 11/1971 | Ferguson et al. | 99/2 |
| 4,172,072 | 10/1979 | Ashmead | 260/115 |
| 4,186,213 | 1/1980 | Burroughs et al. | 426/2 |
| 4,664,905 | 5/1987 | Meyer | 426/2 |
| 4,704,287 | 11/1987 | Meyer | 426/630 X |

OTHER PUBLICATIONS

Poos, M., et al., J. Anim. Sci. Abstrac., #679, pp. 389–390 (1980).
Rock, D. W., et al., J. Anim. Sci. Abstrac., #121, p. 118 (1981).
Sipos, E. and Witte, N. E., J. Am. Oil and Chem. Soc. 38: 11–12,17–19 (1961).
Mustakas, G. C., et al., J. Am. Oil and Chem. Soc. 58: 300–305 (1981).
Tagari, H., et al., Br. J. Nutrition 16: 237–243.
Klopfenstein, Feedstuffs, Jul. 1981: 23–24.

Primary Examiner—Frank Spear
Attorney, Agent, or Firm—Banner & Allegretti, Ltd.

[57] ABSTRACT

Vegetable meal compositions having high-rumen bypass potentials for use in the feeding of ruminant animals, and a method for producing the compositions are claimed. The claimed compositions comprise a protein meal and low levels of zinc ions, with the zinc ions being present in an amount sufficient to provide about 0.003–0.008 parts zinc ions per part of protein in the meal. The composition has a rumen bypass potential, as measured by the "Percent of Total Protein that is Available and Undegraded", or "% AUN", of not less than about 30. The method for producing the composition comprises treating the meals with low levels of zinc ions and heating the mixture under moist heat conditions.

4 Claims, 9 Drawing Sheets

5,508,058

PROTEINACEOUS FEED SUBSTANCES HAVING LOW LEVELS OF ZINC AND HIGH RUMEN-BYPASS POTENTIALS, AND A METHOD FOR THE PRODUCTION THEREOF

BACKGROUND OF THE INVENTION

A. Field of the Invention

The claimed invention relates to the improvement of the nutritive value of soybean meal and other vegetable seed proteinaceous meals for feeding to ruminant animals. More particularly, the invention is concerned with improved meal compositions in which the protein content of the meal is protected from degradation within the rumen of the consuming animal, and the method for producing such meal compositions.

B. Related Art

It has been recognized for some time that the feeding values of some protein-providing feed materials are deleteriously altered by degradation in the rumen of ruminant animals. As a result of such rumen-degradation, the amount of protein that is ultimately available for metabolism by the feeding animal is diminished. It has therefore been considered advantageous to "protect" the protein component of the ruminant feed against being solubilized or metabolized in the rumen, allowing it to pass through in substantially undegraded form. The undegraded protein is thus available for digestion in the post-rumen portion of the feeding animal's digestive system.

With reference to feeding value lost by rumen destruction, soybean meal has a relatively low protein efficiency value. See Klopfenstein, *Feedstuffs*, Jul., 1981, 23–24. Since soybean meal is one of the major protein-containing feed materials used with ruminants, it is particularly desirable to provide a commercially practical means for protecting soybean meal against rumen destruction. For large scale commercial use such a method must be simple, efficient, and of relatively low cost. Such a method should thus be capable of being integrated into existing commercial facilities for processing soybeans and the like into feed materials.

A number of approaches have previously been pursued in attempts to protect the protein component of ruminant feeds. For instance, U.S. Pat. No. 3,619,200 proposes the application to a vegetable meal or other proteinaceous ruminant feed material of a rumen resistant coating. The purpose of the coating is to protect the proteinaceous feed from microbial attack in the rumen, followed by the decomposition of the coating in order to allow digestion of the feed within the abomasum and small intestine.

It has also been known that the solubility of protein in ruminant feed materials can be reduced by treating the feed materials with tannin, formaldehyde, or other aldehydes. In addition, a reduction of protein solubility can be obtained by heating the protein. These procedures are summarized with literature references thereto in U.S. Pat. No. 4,186,213. Feed materials that may be treated by one or more of these procedures to reduce the solubility of the protein in the rumen and to protect against rumen destruction are disclosed as including various vegetable meals.

Other prior art references of interest are:

Hudson et al. (1970), *J. Anim. Sci.*, 30:609–613
Tagari et al. (1982), *Brit. J. Nutr.*, 16, 237–243
Anderson, U.S. Pat. No. 3,463,858 (1969)
Emery et al., U.S. Pat. No. 2,295,643 (1942)
Ashmead, U.S. Pat. No. 4,172,072 (1979)
Meyer, U.S. Pat. No. 4,664,905 (1987)

Hudson et al. describes an experimental comparison in lambs of postruminal nitrogen utilization of commercial soybean meal (72% N soluble) with meal heated 4 hours at 140° C. (35% N soluble). The results suggest that the heated meal was degraded at a slower rate by ruminal microorganisms.

Tagari et al. compared solvent extracted soybean meals of different heat exposures. These included room temperature solvent removal, solvent removal at 80° C. for 10 minutes, and commercial toasted meal steamed at 120° C. for 15 minutes. The meals were fed to rams and rumen liquor samples were tested. Artificial rumen comparisons for ammonia liberation were also made. It was concluded that the main factor determining the different efficiencies of process to non-process soybean meals is their different solubility in rumen liquor. It was also observed that changes in solubility caused by different heat treatments of soybean meal are relatively large in comparison with other meals.

Of particular interest with respect to the present invention are those methods and compositions involving the addition of zinc or other such substances to feed materials. Anderson discloses a procedure for preparing a growth factor for feeding domestic animals and poultry. A zinc salt in aqueous solution, such as zinc chloride or zinc sulfate, is reacted with free amino acids in a proteinaceous feed material. The reaction is carried out in an aqueous solution at a temperature of 60°–70° C. (140°–158° F.), and a pH of 3.5, which pH is said to be achieved automatically with $ZnCl_2$, an adjustment of pH with HCl being used with other zinc salts. The reaction mixture is dried to a moisture content of 2–8%, and mixed with the feed ration. There is no reference to the feeding of ruminants, or to rumen protection of protein.

Emery et al. describes a process in which mineral compounds including zinc and other polyvalent metal oxides, hydroxides, and salts are reacted with proteinaceous feed materials in the presence of water and a protein splitting acid such as $H_3PO_4$, HCl, or $H_2SO_4$. The reacted mixture is dried by heating in air. Soybean meal is indicated as the preferred feed material and zinc is among the metals referred to for use in the form of oxides, hydroxides, or carbonates. Other salts, such as cobalt, are indicated as being used in the form of chlorides or sulfates. The examples illustrate the reaction of large amounts of the metal compounds with soybean meal (Ex. I, 35% and Ex. III 17%, based on the meal). There is no reference in this patent to either rumen protection or nutritional value.

Ashmead proposes the use of metal proteinates for supplying mineral deficiencies in humans and animals. The proteinates are prepared by reacting bivalent metal salts at an alkaline pH with free amino acids of enzyme-hydrolyzed proteins.

Meyer, in U.S. Pat. No. 4,664,905, discloses the addition of zinc to proteinaceous feeds, with the zinc being added in an aqueous solution or in a dry mix with subsequent steaming. The concentration of zinc ions is required to be in the range of 0.25–1.3% by weight, based on the dry weight of the meal.

While industry has previously recognized the use of zinc as an agent for protecting the protein content of vegetable feeds and the like, certain drawbacks have also become associated with its use. Most notably, concerns have been raised regarding the excretion of heavy metals such as zinc into the environment in animal manure.

In response to these concerns, countries throughout the world have enacted regulatory limitations on the maximum allowable levels of zinc in proteinaceous feed meals. Thus, a need has arisen for a feed composition, and a method for producing such a composition, that provides favorable rumen-bypass characteristics while incorporating low levels of zinc relative to compositions that are currently used.

It is also highly desirable for such a process to be either easily integrated into an existing facility for processing soybeans and the like, or even more advantageously, to be capable of being carried out at a remote site, such as a cattle feeding lot, without the need for large-scale equipment.

It is thus an object of the claimed invention to provide a protected feed composition that provides favorable rumen-bypass characteristics while incorporating relatively low levels of zinc.

It is a further object of this invention to provide a method for producing such protected feed compositions that can be easily incorporated into existing commercial facilities for processing soybeans and the like, or that can be carried out at a remote site.

SUMMARY OF THE INVENTION

During the experimental work associated with the development of the present invention, it was discovered that the rumen by-pass potential normally obtained through the inclusion of 0.015–0.02 units of zinc per unit of protein in a meal using dry mixing can be obtained through the use of only about 0.003–0.008 parts of zinc per part protein in the meal, a 60–70% reduction in the amount of zinc, if the zinc and defatted soy flakes are contacted under moist heat conditions. Under such conditions, the total moisture content of the zinc/meal mixture is in the range of 15–30%, with about 20% total moisture being preferred. The heating of the zinc/meal mixture can be carried out in a commercial toaster, at a temperature of 180°–230° F., for 10–30 minutes. The heating can also take place in a combined roaster/conditioner at a temperature of 280°–300° F. Surprisingly, it has also been found that a similar rumen-bypass potential can be obtained if the heating is carried out for much shorter periods of time in a commercial extruder.

Enzyme indigestibility, determined by measuring, in vitro, the rate and extent of protein degradation by protease, is a useful tool for evaluating the rumen by-pass potential of various feeds. Suitable test procedures are described in Poos et al., "A Comparison of Laboratory Techniques to Predict Ruminal Degradation of Protein Supplements", *J. Anim. Sci. Abstra.* 679, p. 379 (1980); and Rock et al., "Estimation of Protein Degradation with Enzymes", *J. Anim. Sci. Abstra.* 121, p. 118 (1981). The utility of enzyme degradation in vitro as a predictor of potential rumen degradation has been established by application to a series of standard protein supplements whose true rumen by-pass properties have been determined in cattle with abomasal fistulas. The preferred enzyme is ficin, which was employed in the tests described below. The values that are determined through the ficin enzyme test are expressed in terms of the "Percent of Total Protein that is Available and Undegraded", or "% AUN".

Table I illustrates typical AUN values for feed treated according to the present invention.

TABLE I

| Moist Heat Treatment* of 9 Lots of Toasted Soybean Meal | | |
|---|---|---|
| Run | AUN | ppm Zn |
| 01 | 41.8 | 1637 |
| 02 | 49.2 | 1779 |
| 03 | 50.5 | 1384 |
| 04 | 53.7 | 1725 |
| 05 | 52.3 | 1518 |
| 06 | 53.6 | 1687 |
| 07 | 57.4 | 1640 |
| 08 | 50.4 | 1907 |
| 09 | 51.9 | 1603 |

*15 lbs. steam/20 minutes/20% moisture

DESCRIPTION OF THE PREFERRED EMBODIMENTS

The method of this invention can be practiced with any proteinaceous vegetable seed meal. Such meals include soybean meal, cottonseed meal, peanut meal, sunflower meal, Canola (rapeseed) meal, palm kernel meal, corn gluten meal, blood meal, safflower meal, and other high-protein seed meals, as well as mixtures thereof. The invention is applicable to defatted, untoasted soybean flakes, referred to as "white flakes", as well as to toasted soybean meal. Based on present information it appears that the best rumen protection is obtained when this invention is applied to defatted, toasted high-protein vegetable meals, especially toasted soybean meal. In general, toasting refers to the heating of protein feed meals after defatting. A description of toasting is given in Sipos and Witte; "The DesolventizerToaster Process for Soybean Oil Meal"; *J. of the Am. Oil Chem. Soc.*, 38, 11 (1961), and in Mustakas, Moulton, Baker and Kwolek; "Critical Processing Factors in Desolventizing-Toasting Soybean Meal for Food:; *J. of the Am. Oil Chem. Soc.*, 58, 300 (1981). The treatment of other seed meals is described in A. M. Altschul, Editor; Processed Plant Protein Foodstuffs; Academic Press, New York, 1958. Patents describing processes for defatting protein meals, and their further processing to remove the solvent and to toast the defatted meal are: U.S. Pat. Nos. 3,268,335, 2,710,258 and 2,585,793.

While the method of this invention is especially advantageous when applied to defatted protein meals, and is described primarily with respect to such meals, it may also be applied to full-fat or partially defatted protein products. The method can also be practiced with related seed material, such as brewer's grains or distillers grains, which are by-products of the fermentation of barley, corn, and other seed grains.

The zinc treating agent is preferably zinc sulfate monohydrate, but other ruminant-edible zinc salts such as zinc acetate or zinc oxide can be used. The zinc salt can be either water soluble or non-water soluble. The zinc salt may be used in an amount corresponding to 0.003–0.008 parts zinc ion per part of protein in the meal, with 0.005 parts zinc per part protein being the preferred amount. Higher levels of zinc can be used but are not needed. Indeed, in keeping with the objectives of this invention, excesses of zinc should be avoided. Lower levels may also be used, which will generally result in a decrease in the rumen-bypass potential of the treated protein.

In general, the claimed method can be carried out in either a batch manner, a continuous manner within an oil seeds processing plant, or in a continuous manner at a site away from an oil seeds processing plant. Within each of these types of processes, a variety of process configurations are possible.

Figure 1:
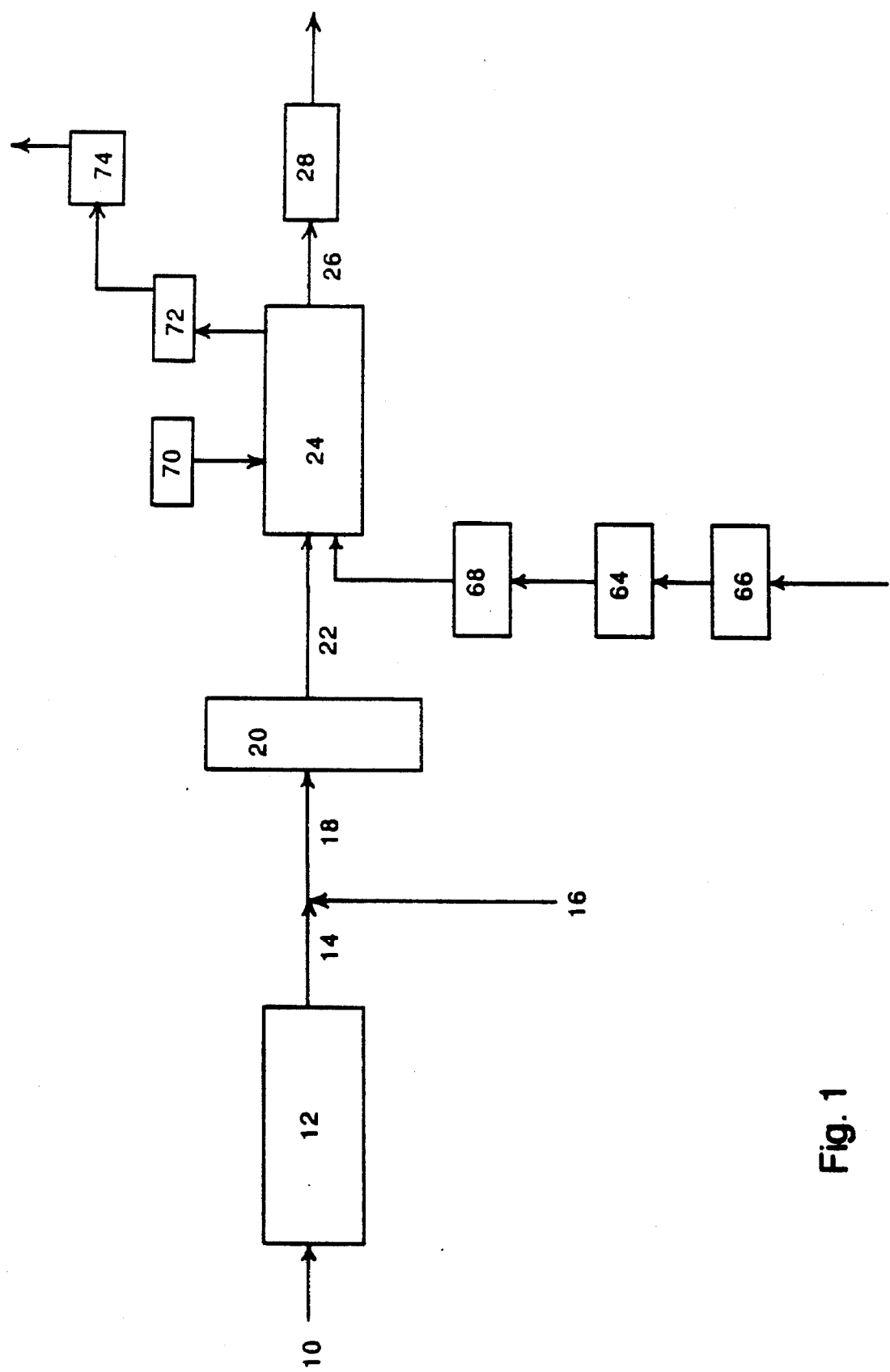
FIG. 1 of the drawing is a flow sheet for carrying out the claimed process in a typical soybean processing facility, with zinc being added prior to the introduction of the meal into a desolventizer-toaster.

For instance, turning to FIG. 1, the claimed method may be carried out as a continuous process for use at an oil seed processing plant. In this embodiment of the process, the zinc salt is added to a soybean meal before the meal is desolventized. First, soybean flakes 10 are introduced into an extractor 12. Solvent wet flakes 14 exit the extractor. Zinc 16 is then added to the solvent wet flakes 14 in an amount equal to about 0.003 to 0.008 parts zinc ion per part of protein in the flakes 14, forming a zinc/flake mixture 18. The zinc 16 may be added in the form of either a dry zinc salt or a zinc salt solution. The mixture 18 is then introduced into a desolventizer-toaster ("DT") 20. Conditions are maintained in the desolventizer-toaster that are favorable to the process of protecting the soybean meal with the zinc ion. The total moisture content of the meal can be in the range of 15–30%, with the preferred moisture content being about 20%. The residence time of the meal in the toaster can range from about 10 to 30 minutes, preferably about 17 to 20 minutes, and the meal therein can reach a temperature of about 180°–230° F. Conditions are typically 220° F. and 20 minutes, with the residence time being a function of the processing rate. Most processing plants maximize throughput, so an average residence time in the DT is about 20 minutes. To achieve longer residence times, the processing plant would be slowed down. Longer residence times improve the bypass potential of low level zinc treated soybean meal or other protein meals. Toasted meal 22 exits the DT 20, and is introduced into a dryer 24. The dryer typically includes a conveyor to move the feed through the dryer as it is subjected to heated air. The dryer may also be a rotary tray dryer. The drying air may be supplied to the feed end of the drier 24 by means of fans 64, which draw in room air through filters 66 and pass the filtered air through indirect steam heaters 68. The drier 24 is preferably arranged so that the drying is completed by the time the meal reaches a midpoint in the drier. Fans 70 may be used to introduce cooling air into the midsection of the drier. The combined drying air and cooling air is drawn from the drier 24 by means of exhaust fans 72. The exiting air passes through a cyclone separator 74, where waste solids are removed before the air is discharged to the atmosphere. The dried toasted meal 26 that exits the drier 24 is protected against rumen degradation, and is thus in condition to be ground and sized in a sizer-grinder 28. The meal may then be packaged or further blended with other feed components.

Figure 2:
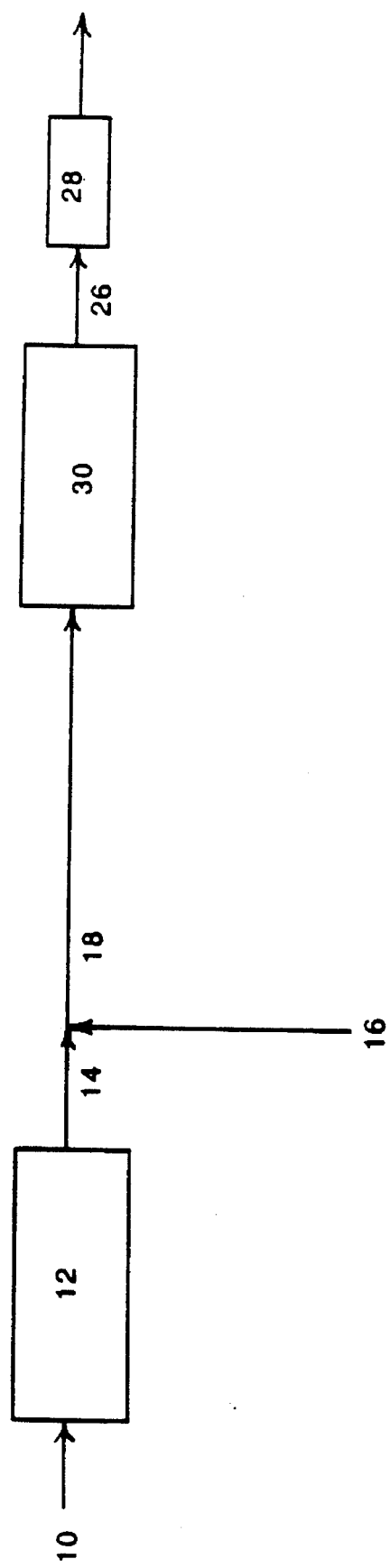
FIG. 2 of the drawing is a flow sheet for carrying out the claimed process in a typical soybean processing facility, with zinc being added prior to the introduction of the meal into a desolventizer-toaster-dryer-cooler.

As shown in FIG. 2, a similar embodiment can be carried out using a desolventizer-toaster-dryer-cooler (DTDC) 30. Toasting is carried out in the desolventizer-toaster portion of the DTDC, while drying is carried out in the dryer-cooler portion. Thus, no external drying is required. Conditions in the dryer-cooler portion of the DTDC are similar to those described with respect to FIG. 1.

Figure 3:
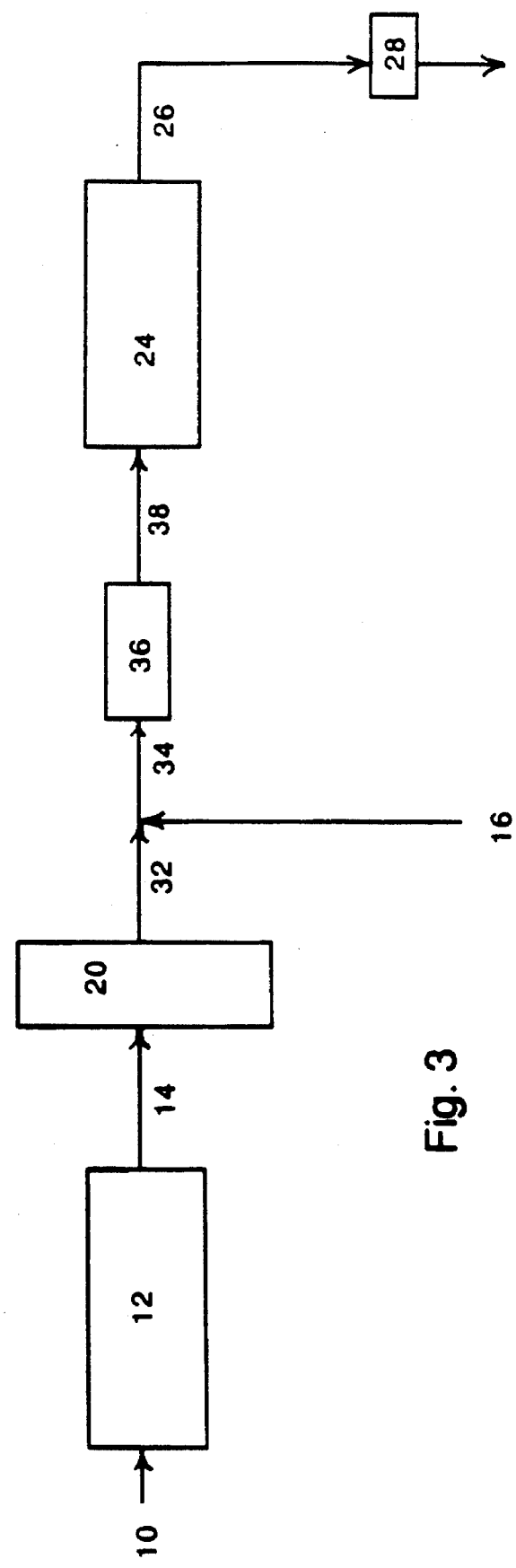
FIG. 3 of the drawing is a diagrammatic flow sheet for carrying out the claimed process in a typical soybean processing facility, with zinc being introduced after the meal is desolventized and toasted.

As shown in FIG. 3, the zinc 16 can alternatively be mixed with a toasted soybean meal after the meal is extracted and desolventized. The zinc 16 is added to desolventized meal 32 to form a zinc/desolventized meal mixture 34. As discussed above, the zinc may be added either in the form of a dry zinc salt or in the form of a zinc salt solution, in the amount set forth above. The mixture 34 is conveyed to a toaster unit 36, which is very similar to a DT in internal configuration. Within the toaster 36, the mixture 34 is subjected to the conditions of approximately 20% moisture and 220° F., for approximately 20 minutes. Heated zinc/meal mixture 38 exits the toaster 36 and is then dried in a typical soybean meal dryer 24.

Figure 4:
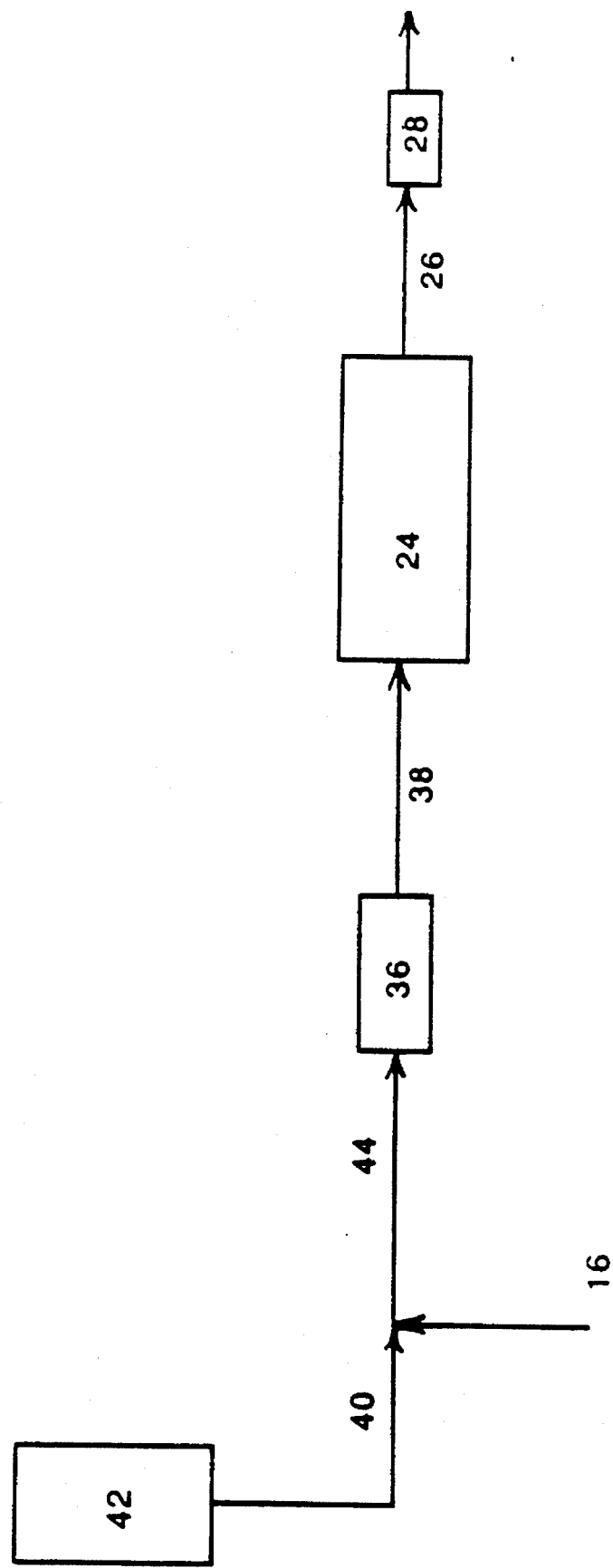
FIG. 4 of the drawing is a diagrammatic flow sheet for carrying out the claimed process beginning with dry toasted meal.

As shown in FIG. 4, the claimed method can also be carried out starting with dried toasted soybean meal. Dried toasted meal 40 from a storage bin 42 is blended with zinc 16. The zinc is supplied either as a dry zinc salt with separately added water, or as an aqueous zinc salt solution. The respective amounts of the zinc and water should be balanced in order to supply the desired level of zinc ion, while raising the moisture content of the toasted soybean meal to approximately 20%. The wetted meal/zinc mixture 44 is heated in a toaster device 36 at approximately 220° F. for approximately 20 minutes. The toasted meal is then passed through a dryer 24 and a sizer-grinder 28, as set forth above with respect to FIG. 3.

Oil seeds such as rape seed (canola), sun flower seed, cotton-seed, and peanut are processed differently from soybeans. The oil seeds are first pressed through an expeller, which removes most of the oil. The oil seed cake contains 5 to 10% oil. This oil is recovered using solvent extraction, usually in a manner similar to that used for soybean oil. The meals can then be heat treated using the processes described in FIGS. 1, 2, 3, and 4, as discussed above.

Figure 5:
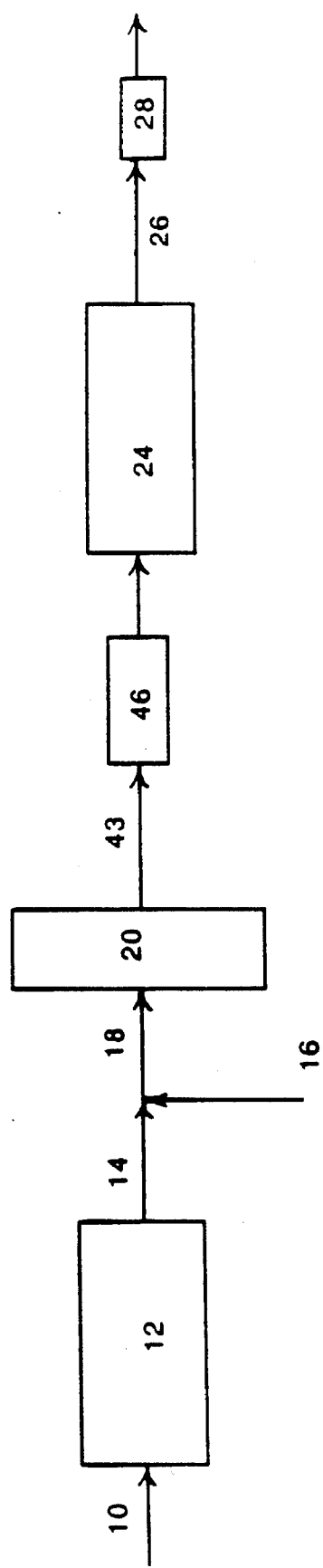
FIG. 5 of the drawing is a diagrammatic flow sheet for carrying out the claimed process with the use of an additional extruder device.

As shown in FIG. 5, a continuous process in an oil seeds facility can also be carried out using a commercial extruder. In this process, zinc 16 in the form of a zinc salt or zinc salt solution can be added to solvent wet flakes 14 as they exit an extractor 12, prior to entering a DT or a DTDC, as described in FIGS. 1 and 2. Alternatively, the zinc 16 may be added to the meal after it exits the DT or the DTDC. In either case, the desolventized/toasted zinc/meal mixture 43 is introduced into an extruder 46 (described more fully herein), where it is heated rapidly to high temperatures. The residence time in an extruder is quite short, typically between 5 and 30 seconds. After exiting from the extruder 46 the heated material is then passed to a dryer/cooler 24, from which it is conveyed into a sizer-grinder 28 prior to packaging or further blending with other feed components.

Each of the above-described processes are typically used in conjunction with a commercial soybean processing facility, due to the availability within such facilities of large commercial toasters, desolventizer-toasters or desoventizer-toaster-dryer-coolers. However, as illustrated in FIG. 6, the instant process can also be carried out at an off-site location by making use of an extruder conditioner.

Figure 6:
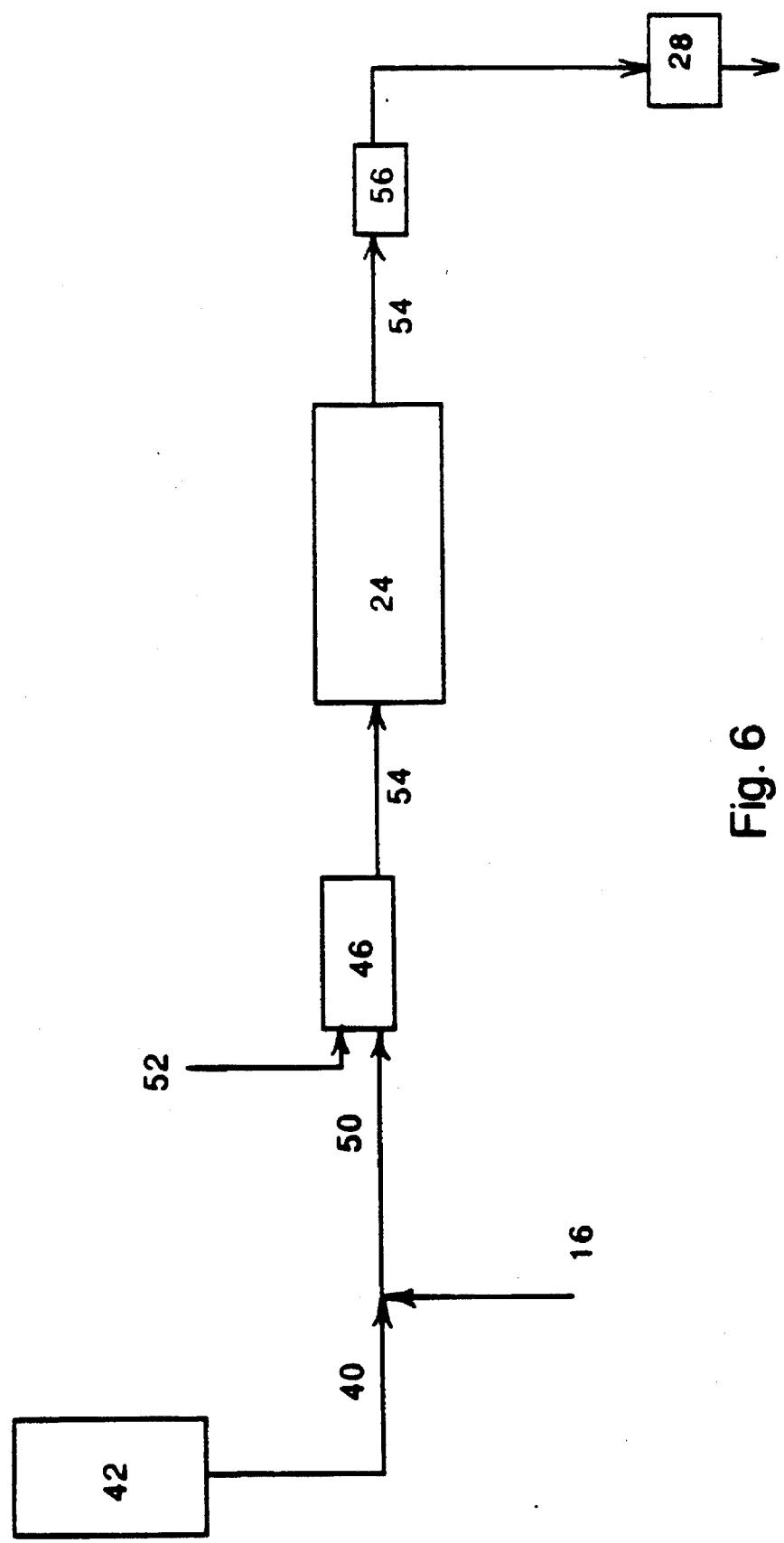
FIG. 6 of the drawing is a diagrammatic flow sheet for carrying out the claimed process at a site remote from a commercial processing facility, with the use of an extruder device.

As shown in FIG. 6, dry protein meal 40 is stored in a storage bin 42. Zinc 16, in the form of a dry salt or a zinc salt solution is then added to the dry meal to form a meal/zinc mixture 50. The mixture 50 is then introduced into an extruder device 50. As used herein, the term extruder includes commercial expellers and expanders, devices that are known to persons of skill in the art. Such devices include large screw type grinders in which a moist material is fed into the feed end of the extruder, where flights on the screw are wide, and the moist mixture is readily admitted. As the mixture proceeds through the extruder under the turning action of the screw, the changing pitch of the screw flights results in increased frictional forces, which in turn results in increased pressure and temperature. The narrow exit end of the extruder is restricted by a cap plate having preformed holes. The meal is thus forced out through the preformed holes at tremendous pressures, and at temperatures of 265°–325° F. The residence time of the meal in the heating apparatus is typically 5–30 seconds, considerably less than in the toasters discussed above. Representative extruders include those manufactured by Wenger™, Sprout-Bauer™, and InstaPro™. In a Wenger™ extruder, temperatures of 280°–325° F. are preferred. In the Sprout-Bauer™ and Insta-Pro™ extruders, temperatures of 265°–290° F. are preferred. Returning to FIG. 6, if dry zinc salt is used, then water or steam 52 is added independently into the extruder device 46 to provide the preferred moisture content of approximately 20%. Within the extruder, the meal/zinc mixture is heated rapidly to high temperatures. Treated meal 54 exits the extruder device 46, and is then passed in sequence to a dryer 24, a cooler 56, and a sizer-grinder 28. In this process, no toaster is required, thus making it feasible to practice the process outside of the confines of a commercial processing facility. Furthermore, the moist heat treatment in the extruder 46 takes considerably less time than treatment in a DT or a DTDC or a toaster. Finally, if it is so desired, the expeller can be equipped with dies and a rapid cutting device, so that the extruded feed can be shaped and pelletized directly.

Figure 7:
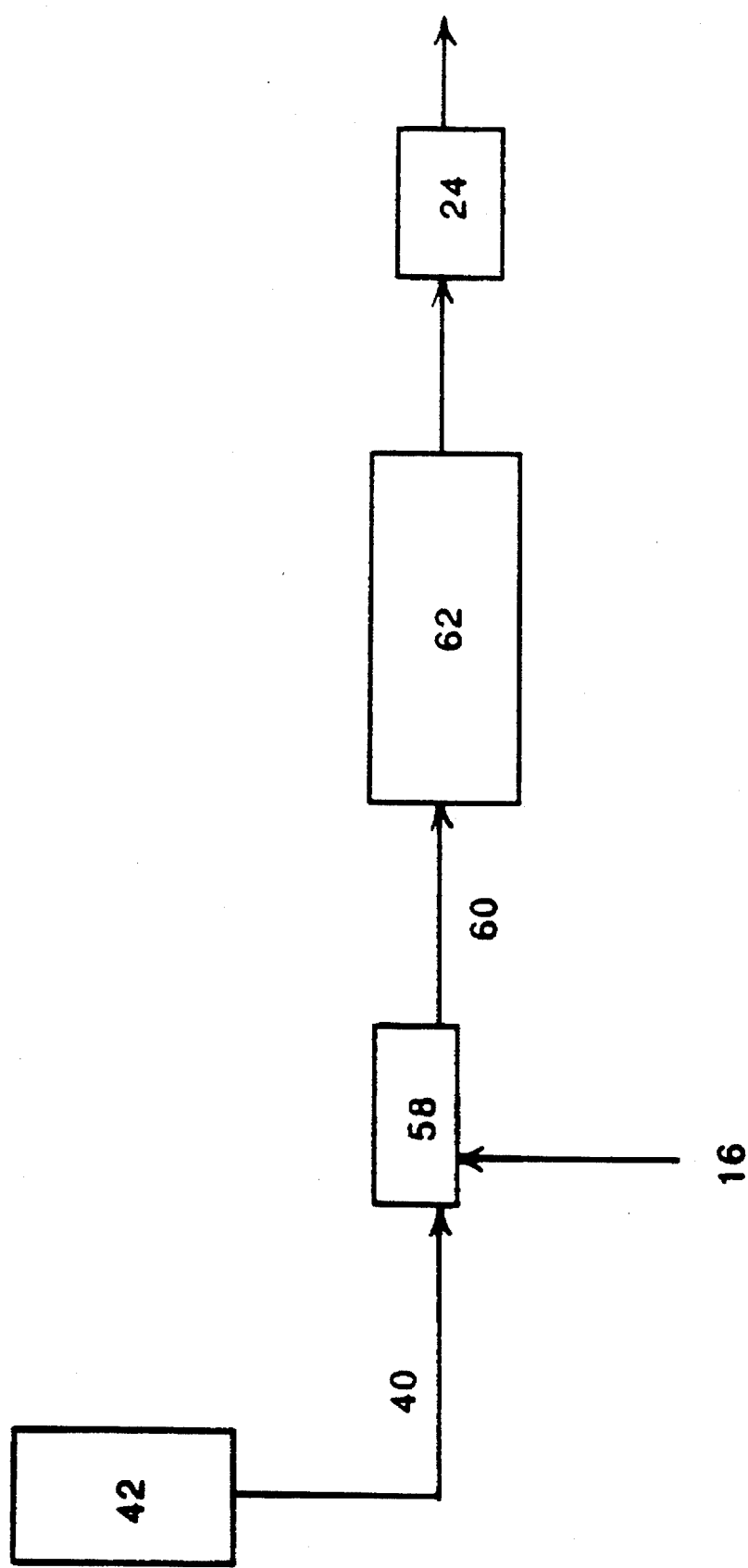
FIG. 7 of the drawing is a diagrammatic flow sheet for carrying out the claimed process in a batch manner.

The instant process can also be carried out in batch manner, as described in FIG. 7. In this configuration, dry protein meal 40 is stored in a storage bin 42. Water and zinc salt 16 are added, either separately or in solution, in order to achieve the desired zinc content set forth above, and approximately 20% total moisture. The meal 40, zinc 16, and water may be introduced into a mixer 58, where they are thoroughly mixed. The resulting mixture 60 is introduced into a batch cooker 62 where it is heated for approximately 20 minutes at 220° F. The total residence time in the cooker is slightly longer than 20 minutes, due to the time required for the cooker to reach the necessary temperature of 220°. The contents should be discharged from the batch cooker hot in order to take advantage of the flash evaporization of water remaining in the mixture. Upon exiting the batch cooker the meal is passed into a dryer 24, from which it is then packaged.

In the most preferred embodiment of the claimed process, the protein meal can be heated in a combination roaster/conditioner, a device that has been used in the past to roast and condition whole beans. A representative device is manufactured by Jet-Pro, Inc., of Atchison, Kansas. The other process conditions are similar to those shown in FIG. 7, with the roaster/conditioner taking the place of the cooker 62.

In order to carry out the process, a defatted, partially defatted or full fat protein meal is heated, with or without zinc, in a continuous flow roaster, followed by conditioning of the meal with low levels of zinc under moist-heat conditions in an insulated continuous-flow conditioning chamber. In the hot-air roaster, the meal is dragged across a grated floor by a drag conveyer. Air, heated to a temperature of approximately 400°–500° F. by a gas burner, is forced through the grated floor to heat the meal as it is conveyed through the oven. The residence time of the meal in the oven is from 2–5 minutes, sufficient time to heat the meal to a temperature of 280°–300° F. The heated meal then exits the hot air oven, and enters an insulated continuous-flow conditioning chamber. Once the meal has entered the conditioning chamber, either water or a zinc solution is added, depending on whether zinc was previously mixed with the meal. The meal is moved through the conditioning chamber by a series of drag conveyers. Within the conditioning chamber, the meal is heated for an extended period of time, generally about 30–60 minutes, and preferably about 40 minutes. A cooling fan may be used to return the meal/zinc mixture back to ambient temperature. The meal, having been treated with low levels of zinc under moist heat conditions, exits the device through an outlet duct.

As discussed above, the method can be applied to either defatted, partially defatted, or full-fat protein meals. Application of the method with partially defatted or full-fat meals can also be carried out in an oilseeds processing plant. For example, full-fat protein flakes such as soybean flakes are mixed with either a dry zinc salt or a zinc salt solution to provide the appropriate level of zinc ions, and are then passed through an expander. The expander is operated at an elevated temperature, ranging from 220° F. to 280° F., with any needed moisture being added in the form of steam. The elevated temperature allows the added moisture to flash off. The full fat meals can also be toasted in a desolventizer-toaster.

The claimed method can also be applied to partially defatted protein meals, such as those that have been treated in an expeller to remove some of their oils. Immediately after exiting the expeller, zinc is added to the hot meal, either as a dry zinc salt or as a zinc salt solution. The zinc treated meal is then passed through an expander or an expeller, where it is heated to temperatures in the range of 220° F. to 280° F. Moisture may be added to the meal as needed either before or during this heating. Alternatively, the zinc treated partially defatted meals can be toasted in a desolventizer-toaster. The major difference in processing zinc treated full-fat versus partially defatted protein meals is that full-fat meals would not be treated in an expeller, since the expeller would press out the oil.

The method of the present invention results in several benefits, including improved milk production, improved persistence of milk production, improved steer growth using the Limit-Gro concept, and improved efficiency of feeding steers. These benefits are further illustrated by the following examples:

EXAMPLE 1

Toasted soybean meal having 48% protein was obtained. One half of the meal remained untreated and served as the control. The remaining half was treated as follows. The 48% protein soybean meal was mixed with 1875 ppm of zinc ion from zinc sulfate and then exposed to 15 pounds of steam for 20 minutes in a closed vessel. Condensing steam raised the moisture of the meal to about 20%. After heat treatment, the meal was dried to 12% moisture using pellet cooler fitted with fine mesh screen, bagged and stored until used. In vitro degradability analysis using the ficin assay showed the untreated and treated meals to have an available undegraded nitrogen (% AUN) of 19.8% and 60.9% respectively.

Forty (40) Holstein steers averaging 542.3 pounds were used in a 42 day trial to evaluate the untreated versus treated soybean meal as protein sources in high corn silage rations. Urea, 0.1 pound per day, supplied rumen soluble nitrogen. Cattle were randomly allocated on the basis of live weight into four groups using a completely randomized design. Following weight equalization, groups of ten (10) steers were randomly allotted to pens. Rations fed during the experimental period consisted of 90.73% to 91.94% corn silage, 4.0% to 7.07% shelled corn, 1.24% to 2.86% control or treated soybean meal, 0.28% to 0.32% urea, and 0.69% to 0.89% of a special premix. Rations were fed daily. The ration containing treated soybean meal demonstrated improved daily weight gain (3.11 pounds versus 3.00 pounds for untreated). Pounds of dry matter consumption per pound of gain were reduced in steers receiving the treated soybean meal (5.32 for treated and 5.65 for untreated). Since weight gains were improved with a reduction in dry matter intake, feeding efficiency favored those steers consuming the treated soybean meal. These data indicate that a successful bypass protein can be produced when 48% protein toasted soybean meal is treated with low levels of zinc and moist heat.

EXAMPLE 2

48% protein toasted soybean meal was obtained. One half of the meal obtained was left untreated and served as the control. The remaining half was treated as follows. The 48% protein soybean meal was treated with 1875 ppm zinc ion from zinc sulfate and then exposed to 15 pounds of steam for 20 minutes in a closed vessel. Condensing steam raised the moisture content to about 20%. After heat treatment, the meal was dried in a pellet cooler fitted with a fine mesh screen. For the intended trial, 15 batches of treated meal were prepared. The meal from the 15 batches was thoroughly mixed, bagged, and stored for further use.

In vitro degradability analysis using the ficin assay of each batch was made. These analyses are shown in Table II.

TABLE II

% Available Undegraded Nitrogen of 48% Protein Toasted Soybean Meal Treated with Zinc Ion.

| Batch 1 | 52.2 |
|---|---|
| Batch 2 | 56.3 |
| Batch 3 | 52.7 |
| Batch 4 | 58.0 |

TABLE II-continued

% Available Undegraded Nitrogen of 48% Protein Toasted Soybean Meal Treated with Zinc Ion.

| Batch 5 | 61.9 |
|---|---|
| Batch 6 | 63.4 |
| Batch 7 | 57.6 |
| Batch 8 | 64.9 |
| Batch 9 | 60.2 |
| Batch 10 | 61.6 |
| Batch 11 | 62.6 |
| Batch 12 | 63.0 |
| Batch 13 | 61.8 |
| Batch 14 | 58.9 |
| Batch 15 | 61.3 |
| Mean 1–15 | 59.8 ± 3.65 |

The % AUN of the untreated soybean meal was 23.7.

The untreated and treated soybean meals used in this trial were also analyzed for % of bypass of protein using the dacron bag technique in fistulated steers. The data is shown in Table III and parallels the ficin in vitro data.

TABLE III

Dacron bag (% bypass protein) values of the soybean meal used to manufacture DFP-1041 and DFP-1042.

| | % Degradation of Protein | % Bypass of Protein |
|---|---|---|
| Untreated soybean meal | 72.50 | 27.50 |
| Treated soybean meal | 33.05 | 66.95 |

Sixty-four lactating cows were initially assigned to one of two experimental diets. The experimental feeds consisted of a 16% protein complete dairy pellet. The formulas for the two feeds were put together to maximize the inclusion of soybean meal. To accomplish this, a minimal amount of wheat midds was allowed (6%) in the formulas. The test feeds, referenced as DFP-1041 and DFP1042, contained 60% corn, 20% soybean meal, and 6% wheat midds. DFP-1041 contained the untreated 48% protein soybean meal, while DFP-1042 contained the low level zinc treated 48% protein soybean meal. Both rations contained sodium bicarbonate.

The test consisted of a two week preliminary period followed by a six week test period. During the test, 19 cows dropped in milk production (due to stage of lactation) such that they received little or no grain (complete feed). Grain intake is automatically adjusted according to milk production by computer. The cows that reached the point of receiving little or no grain during some part of the test period were removed when the data were analyzed. Data from forty-five cows were used for comparison purposes. The forty-five cows consisted of 24 first lactation heifers and 21 mature cows.

TABLE IV

| | Milk Production and Composition Data | | | | | |
| --- | --- | --- | --- | --- | --- | --- |
| | Milk (lb) | | Fat (%) | | Protein (%) | |
| | Preliminary | Test | Preliminary | Test | Preliminary | Test |
| Control-1041 | 54.2 | 54.1 | 4.01 | 3.38 | 3.04 | 3.24 |
| Test-1042 | 54.4 | 57.3 | 3.57 | 3.15 | 3.07 | 3.18 |

Milk production data are summarized by block (stage of lactation) and are shown in Table V.

TABLE V

| | | Control-1041 | | Test-1042 | |
| --- | --- | --- | --- | --- | --- |
| Block | DIM* | Preliminary | Test | Preliminary | Test |
| 1 | 50 | 56.0 | 60.3 | 53.7 | 62.7 |
| 2 | 51–100 | 58.1 | 55.5 | 63.1 | 62.9 |
| 3 | 101–150 | 52.0 | 49.5 | 52.3 | 51.4 |
| 4 | 150 | 47.1 | 44.9 | 51.6 | |

*DIM = days in milk at initiation of preliminary period.

Figure 8:
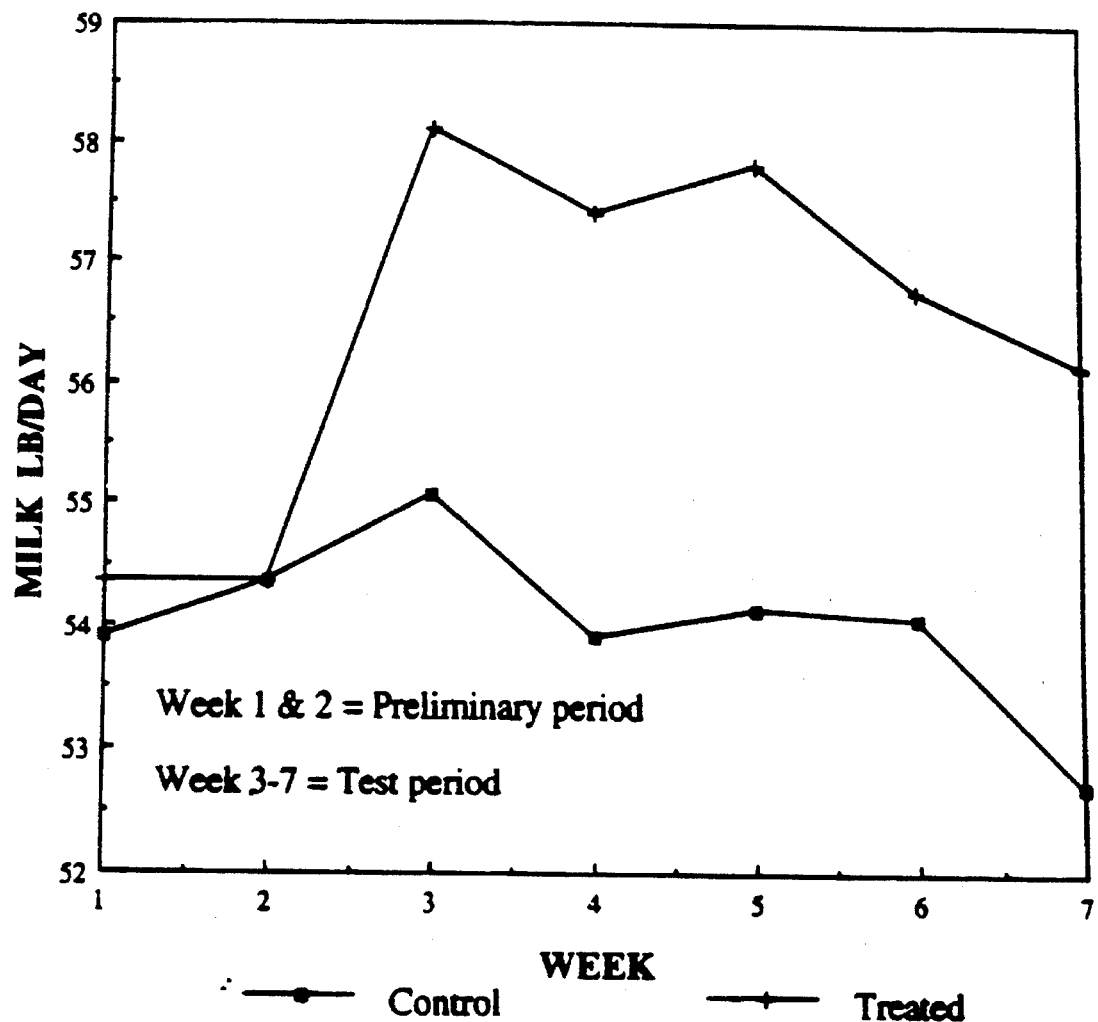
FIG. 8 of the drawing is a graph showing milk production for animals fed with the low level zinc treated meal versus animals fed a control meal.

Milk production is shown in FIG. 8. Cows fed the low zinc treated soybean meal ration produced more milk in all stages of lactation as compared to control cows. It was interesting to note that even cows that were in excess of 150 DIM when the study was initiated, benefitted from the ration containing the low level zinc treated soybean meal. FIG. 8 shows this persistence in lactation.

Cows fed the low level zinc treated soybean meal ration produced on the average, 3 pounds more milk per day as compared to the control ration. The low level zinc treated feed had no effect on milk fat or milk protein.

EXAMPLE 3

A single lot of 48% protein toasted soybean meal was obtained. One half of the meal was set aside for use as the control. The other half was blended with 1875 ppm of zinc ion from zinc sulfate. The zinc ion containing toasted soybean meal was processed through a Wenger™ X155 extruder under the following conditions: Barrel—heads; 6 Die, peripheral; 156 round holes, each 3/16 inch diameter (3 rows of holes), two rows of 54 and one row of 48; knife, 4 blades. The toasted soybean meal containing zinc ions was fed at a rate of 1200–1300 lbs per hour. Water feed rate was 300 pounds per hour at 150° F., 190° F. at downspout. The % AUN of the treated meal after extrusion by the ficin test was 71.5.

High producing dairy cows were used in a 56 day lactation study to evaluate a 17% protein complete grain ration. One 17% protein complete grain ration (DFP-833) contained 16.5% untreated toasted 48% protein soybean meal (the control), and the other ration (DFP-832) contained 16% treated 48% protein soybean meal (the test). Besides the complete grain ration, a low level of high moisture corn, a 50—50 mixture of corn silage and haylage, plus good quality hay were fed.

Fifty to fifty-two lactating Holstein cows were allocated into two groups, based upon days in milk, milk production, lactation number, and percent milk fat. Forty-three cows finished the study and were included in the test. The performance of lactating Holstein cows is shown in Table VI.

TABLE VI

| | Milk Production Pounds | Milk Fat, % | Milk Protein, % |
| --- | --- | --- | --- |
| Control DFP-833 | 62.4 | 3.57 | 3.17 |
| Test DFP-832 | 67.0* | 3.56 | 3.25 |

*significantly different from the control at p = 0.0001.

Figure 9:
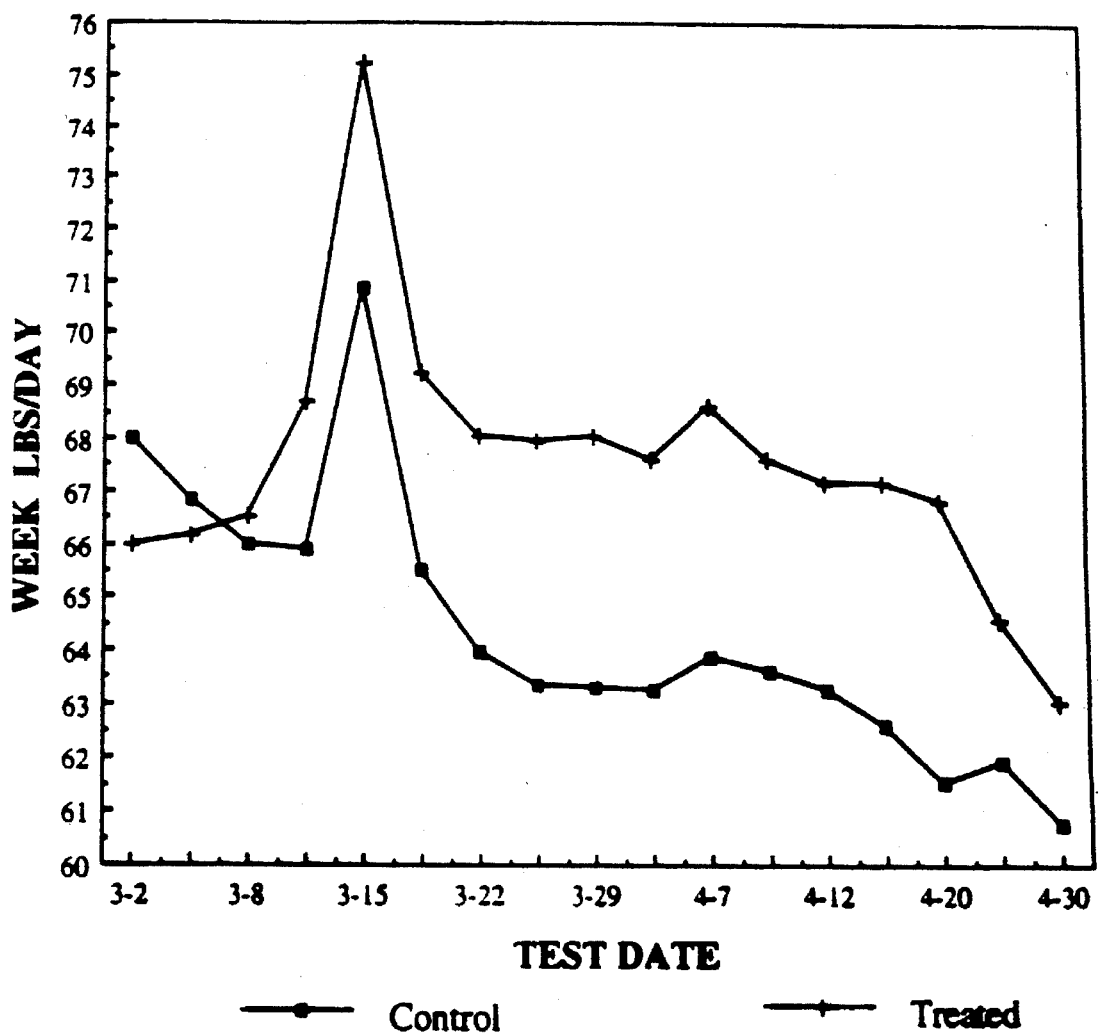
FIG. 9 of the drawing is a graph showing milk production for animals fed with meal containing low levels of zinc, processed in an extruder, versus animals fed a control meal.

This test clearly demonstrates that milk production for dairy cows fed the test diet containing the low level zinc containing extruder processed toasted soybean meal outperformed the control diet fed cows by almost 3 pounds of milk per day. The treated diet also maintained a persistently higher rate of milk production throughout the test as shown in FIG. 9.

EXAMPLE 4

48% protein toasted soybean meal was obtained and divided into two portions. One portion was set aside and used as the untreated control. The other portion was processed through an INSTA-PRO™ 2000 extruder. The process is described as follows. The toasted meal was blended with 130 pounds of water per ton and 80 pounds per ton feed grade fat. This blend was processed through an INSTA-PRO™ 2000 extruder. Temperature at the exit was 275° F. Production rate was 1800 pounds per hour. The ficin value of the treated meal was 50.7%, plus or minus 3.6%.

Fifty-eight lactating Holstein cows were allotted into two groups based on days in milk (DIM), milk production, lactation number, and percent milk fat. Due to various reasons, fifty-six cows finished the test. During an extended standardization period, all cows were offered a 17% protein complete dairy feed. During the test period (May 31 to Jul. 26), a control feed, DFP-843, a 17% protein complete feed with untreated, toasted soybean meal was compared to DFP-842, a 17% complete dairy feed identical to DFP-843 except low level zinc treated soybean meal was substituted for the untreated meal in the formula. Urea at a level of 0.5% was added to the grain ration to supply ruminal nitrogen. Roughages were a 50:50 mixture of corn silage and haylage. All cows had access to good quality alfalfa hay.

Milk production of the cows receiving the experimental ration, DFP-842, was significantly improved over those cows receiving the control ration, 63.2 versus 62.6 pounds (P 0.05). There was no difference in percent milk fat or milk protein. These data show that lower levels of bypass protein improve milk production but not to the extent of the high level (71.54%) reported in Example 3.

EXAMPLE 5

A single lot of 48% protein toasted soybean meal was obtained. One half of the meal was set aside for use as the control. The other half was blended with 1875 ppm of zinc ion from zinc sulfate. The zinc ion containing toasted soybean meal was processed through a Wenger™ X-155 extruder under the following conditions: Barrel—6 heads; die, peripheral; 156 round holes, each 3/16 inch diameter (3 rows of holes), two rows of 54 and one row of 48; knife, 4 blades. The toasted soybean meal containing zinc ions was fed at a rate of 1200–1300 pounds per hour. Water feed rate was 300 pounds per hour at 150° F., 190° F. at the downspout. The % AUN of the treated meal after extrusion was 71.5.

Eighty cross-bred steers averaging 704.1 pounds were randomly allotted into eight groups of 10 steers each on the basis of breed and weight. During a pre-trial phase, a ration consisting of a full feed of corn silage, 5 pounds of shelled corn per head per day and 1.5 pounds of supplement BGP-830 were fed. During the trial phase of 49 days shelled corn, corn silage, supplement, and a Rumensin-Tylan carrier formed the rations which were either full-fed or restricted to 1.75 to 2.04% of body weight. The results of the experiments showed that daily gains were significantly improved (1.94 pounds versus 2.20 pounds) in those steers receiving the low level zinc treated soybean meal (P <0.01). Efficiency of dry matter conversion favored those steers receiving the low level zinc treated soybean meal. (7.71 pounds versus 6.84 pounds); (P 0.01). Differences in feed and dry matter intake were similar across protein treatments. While in the foregoing there have been described preferred embodiments of the invention, it should be understood to those skilled in the art that various modifications and changes can be made without departing from the true spirit and scope of the invention as recited in the claims.

What is claimed is:

1. A method of producing an improved feed for ruminant animals consisting essentially of:

a) combining protein meal with a zinc salt to form a mixture, with said zinc salt being present in an amount sufficient to provide about 0.003–0.008 parts zinc ions per part of protein in the meal, and b) heating the mixture under moist conditions in a protein meal extruder at a temperature between about 265° F. and about 325° F.

2. The method of claim 1, in which the zinc salt is present in an amount sufficient to provide about 0.005 parts zinc ion per part of protein in the meal.

3. The method of claim 1 wherein the protein meal is toasted protein meal.

4. The method of claim 1, wherein the protein meal comprises components selected from the group consisting of soybean, rapeseed, sunflower, canola, cottonseed meal, peanut meal, safflower meal, palm kernel meal, corn gluten meal, and blood meal.

* * * * *